Feb. 10, 1970 R. T. REINHARD 3,493,984
DOCK LEVELER
Filed April 29, 1968 3 Sheets-Sheet 1

INVENTOR
RAYMOND T. REINHARD
BY Samuelson & Jacob
ATTORNEYS

United States Patent Office 3,493,984
Patented Feb. 10, 1970

3,493,984
DOCK LEVELER
Raymond T. Reinhard, 337 Broadway,
Passaic, N.J. 07055
Filed Apr. 29, 1968, Ser. No. 725,040
Int. Cl. B65g *11/00*
U.S. Cl. 14—71                    9 Claims

ABSTRACT OF THE DISCLOSURE

A dock leveler for forming a smooth path between a dock and a truck bed having a bridging plate hinged to the dock (first hinge), a lip plate hinged to the bridging plate (second hinge) and means connected to the lip plate for moving the plates with respect to the dock and the bed. The force from the moving means is first applied such that the moment of force of its force vector about the second hinge is such that the plates fold toward each other and raise the second hinge above the dock and truck bed to thereby form an acute angle between the bridging plate and the lip plate. The moment of force of the moving means force vector about the second hinge is now such that both plates are raised to a position in which they abut to form a continuous plate. In this position, the sum of the moments of force about the second hinge is such that upon releasing the raising means the dock leveler drops in its unfolded position to make contact with the truck bed and thereby provide a smooth path from the truck bed to the dock.

---

The invention relates to dock levelers for providing a smooth path between a dock and a vehicle bed and in particular to such dock levelers which are raised when a fluid operated cylinder is actuated and are lowered when the cylinder is deactuated. More especially the invention is directed toward a simplified dock leveler in which there is much less likelihood that the cylinder will be damaged by a truck which is backing in to the dock preparatory to loading or unloading.

Prior art dock levelers have all been constructed with relatively complex members in order to accomplish the desired purpose of operational simplicity. By "operational simplicity" is meant easy, button or lever actuated functions on the part of the dock crew. Moreover, in many of these prior art dock levelers, which were moved by fluid operated cylinders, the cylinder was often ruptured because it was struck by the overhang of a backing vehicle. Alternatively, it was necessary to remove a portion of the dock to recess and protect the cylinder.

These prior art dock levelers, which possessed operational simplicity, were of relatively complex mechanical construction. Many of them were provided with bell cranks, or torsion springs or other complex mechanical linkages in order to afford operational simplicity. On the other hand, those, which were relatively simple in construction, were much more difficult to operate. Such units often required more than one man and the expenditure of considerable manual strength.

Accordingly, it is an important object of the invention to provide a dock leveler which is both simple in construction and easy to operate. Dock levelers of the invention do not require manual exertion on the part of the users and their mechanisms are compact enough so that they may be installed without the need of altering the dock configuration and/or forming a recessing pit.

It is a further object of the invention to provide such a dock leveler which is raised by the actuation of a fluid operated cylinder and lowered by the deactuation of the cylinder.

It is a still further object of the invention to provide a compact mechanism for a dock leveler wherein there are a pair of fluid operated cylinders placed side by side with their operating rods opposite each other so that the distance the dock leveler is raised with respect to the dock is substantially equal to the sum of the movements of the operating rods.

It is a still further object of the invention to provide a bracket for such a dock leveler wherein the bracket is affixed to the lip plate. The bracket is of such shape that the plates of the dock leveler do not collapse toward each other when the dock leveler is being raised and the dock leveler drops to form a smooth path between the dock and the vehicle bed when the fluid operated cylinders are deactuated.

These and other objects, features, advantages and uses will be apparent during the course of the following description when taken in conjunction with the accompanying drawings wherein.

Figure 1:
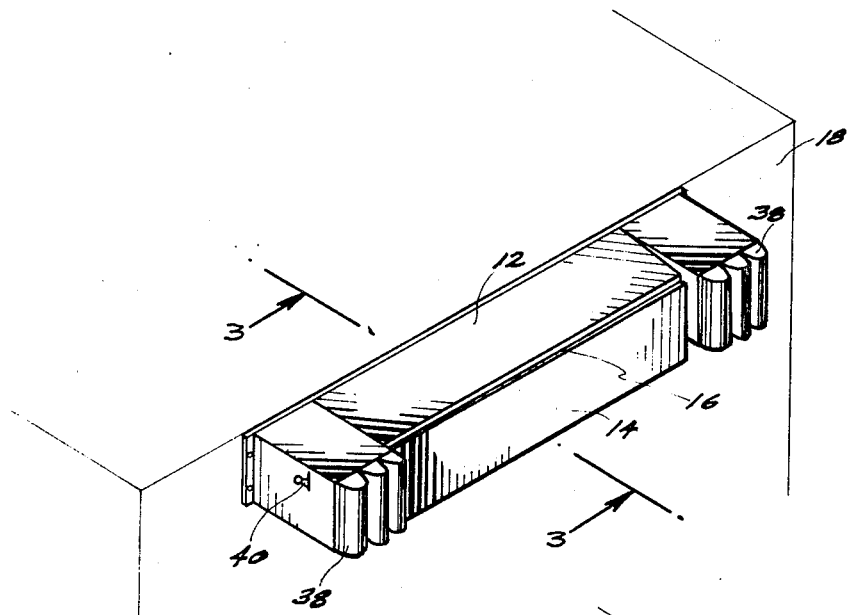
FIGURE 1 is an isometric view of a preferred form of dock leveler of the invention showing the dock leveler in its first position in which the bridging plate is horizontal and the lip plate is vertical.
Figure 2:
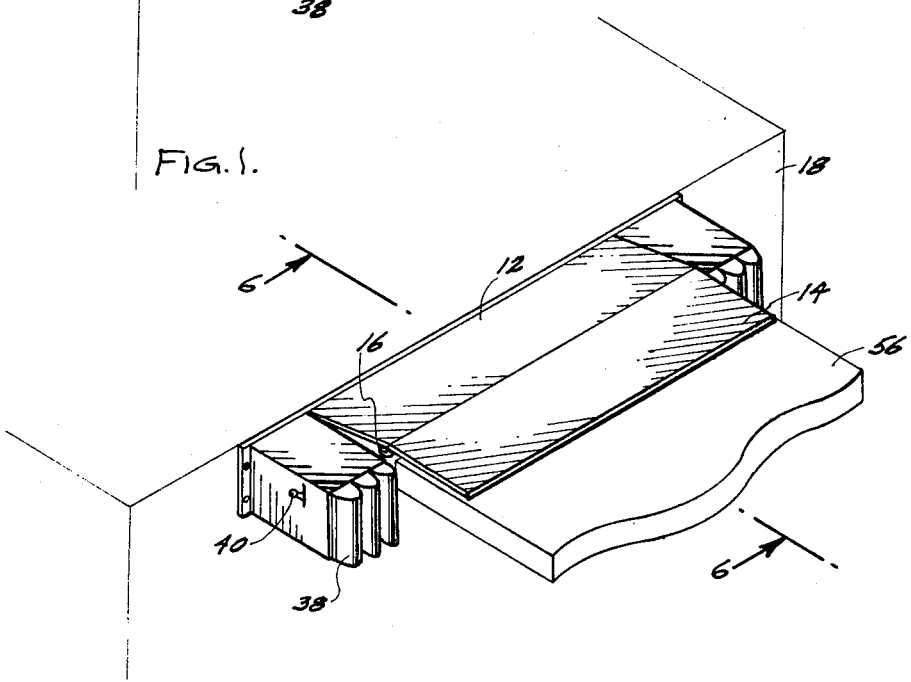
FIGURE 2 is an isometric view of the dock leveler of FIGURE 1 wherein the bridge plate and the lip plate are extended between the dock and the vehicle bed to provide a smooth path therebetween.

In the drawings, wherein, for the purpose of illustration, is shown a preferred embodiment of a dock leveler of the invention and wherein like numerals designate like parts throughout the same, the numeral 10 designates the dock leveler, generally. Dock leveler 10 is seen to comprise bridging plate 12, lip plate 14 and hinge 16 connecting plates 12 and 14.

Figure 3:
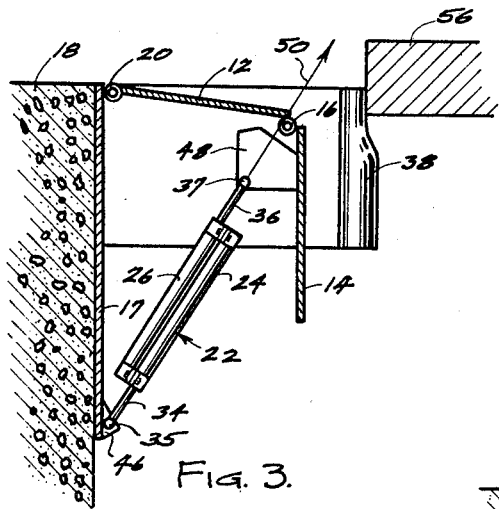
FIGURE 3 is a sectional view taken along the lines 3—3 of FIGURE 1, viewed in the direction of the arrows.
Figure 4:
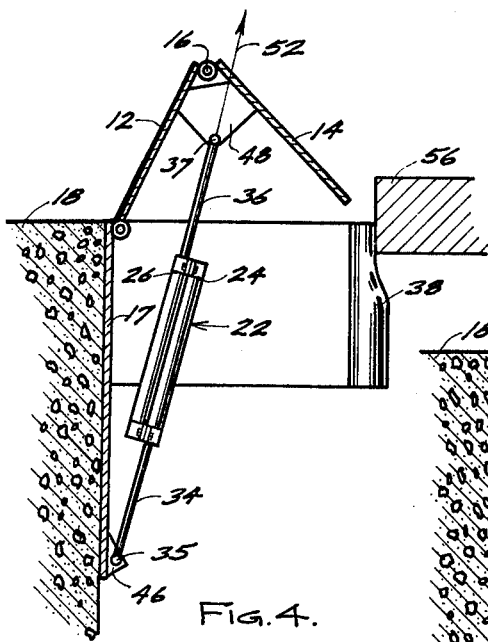
FIGURE 4 is a view similar to that of FIGURE 3 showing the dock leveler in its second position wherein the junction of the two plates is higher than either plate and the angle between the plates is acute.

Mounting plate 17, which is affixed to dock 18 (FIGURES 3–6), is affixed to plate 12 by means of hinge 20. The plates are raised from the position of FIGURE 3 to the positions of FIGURES 4 and 5 by operating means 22 which preferably takes the form of a pair of fluid operated cylinders 24 and 26. The cylinders 24 and 26 are bolted together as shown in FIGURES 7 and 8 by bolts 28 and nuts 30 which cooperate with mounting ears 32 which are affixed to each of the cylinders.

The cylinders 24 and 26 are mounted so that when they are actuated, the rods 34 and 36 associated therewith move in opposite directions. Thus, the stroke applied to the dock leveler is equal to the sum of the individual strokes from the rods 34 and 36. Before a truck arrives at the dock 18, the dock leveler 10 is in the first position (FIGURE 1) in which the surfaces of the bridging plate 12 are substantially horizontal and those of the lip plate 14 are substantially vertical. The truck backs up until it contacts bumpers 38 and the dock operator actuates valve 40 to raise the dock leveler.

Figure 7:
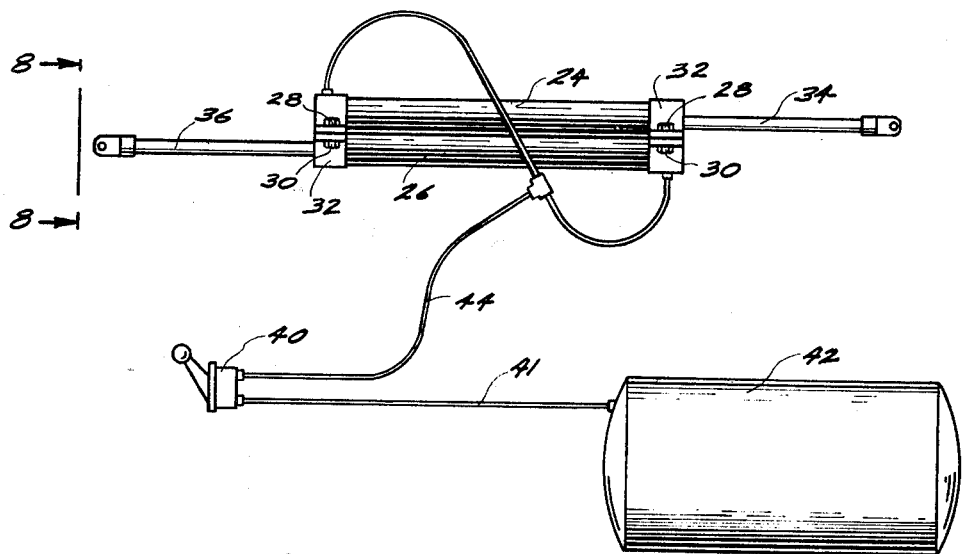
FIGURE 7 is a diagrammatic view of the operating cylinders, the source of fluid and the control means.
Figure 8:
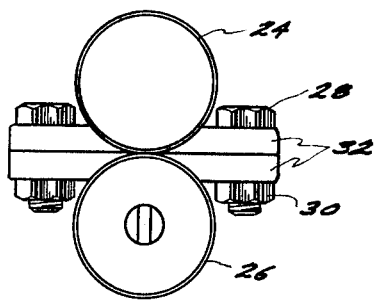
FIGURE 8 is an enlarged end view of the operating cylinders.

Valve 40 is opened when it is actuated so that compressed air or other fluid is supplied from tank 42 through lines 41 and 44 to cylinders 24 and 26 (FIGURE 7). This causes rods 34 and 36 to be pushed outwardly from the cylinders. When valve 40 is released (deactuated), the valve closes line 41 so no air is supplied from tank 42 and the air in the cylinders is vented through the valve to the atmosphere. This causes the rods 34 and 36 to be pushed into their respective cylinders due to the mass of the dock leveler acting on them.

End 35 of rod 34 is pivotally affixed to lug 46 which is attached to mounting plate 17. A connection pivotally connects end 37 of rod 36 to bracket 48 which is affixed to lip plate 14. As the dock leveler rests in its starting (first) position (FIGURE 3) the bridging plate 12 extends outwardly from the dock and it is seen that when operating means 22 is actuated the resulting moment of force by vector 50 (which is directed inwardly of hinge 16) about hinge 16 is in a first direction which, in the illustration, is clockwise causing lip plate 14 and bridging plate 12 to form an acute angle to thereby allow necessary clearance between lip plate 14 and truck bed 56.

As the dock leveler is raised to the second position (FIGURE 4) wherein the hinge 16 is the highest element of the dock leveler the movement of lip plate 14 toward bridging plate 12 is stopped because bracket 48 contacts bridging plate 12. This precludes any further closing of the two plates. In this position the moment of force by vector 52 (which is now directed outwardly of hinge 16) about hinge 16 is in a second direction which, in the illustration, is counterclockwise and which is opposite to the first direction. Because of this relationship, further actuation of the operating means causes the dock leveler to rise to the third position (FIGURE 5) wherein the lip plate and bridging plate abut to form one continuous plate. In this position vector 53 is a great force because it is supporting the combined weight of the bridging and lip plates and most important the sum of the moments of force about hinge 16 by vector 54, representing the mass of lip plate 14 and by vector 53, representing the actuating force results in and sustains a moment in the second direction, illustrated as a counterclockwise moment. This relationship prevails as pressure is slowly vented from the cylinders because the force represented by vector 53 continues to assert itself. If this relationship were not maintained, the plates of the dock leveler would collapse toward each other.

Figure 5:
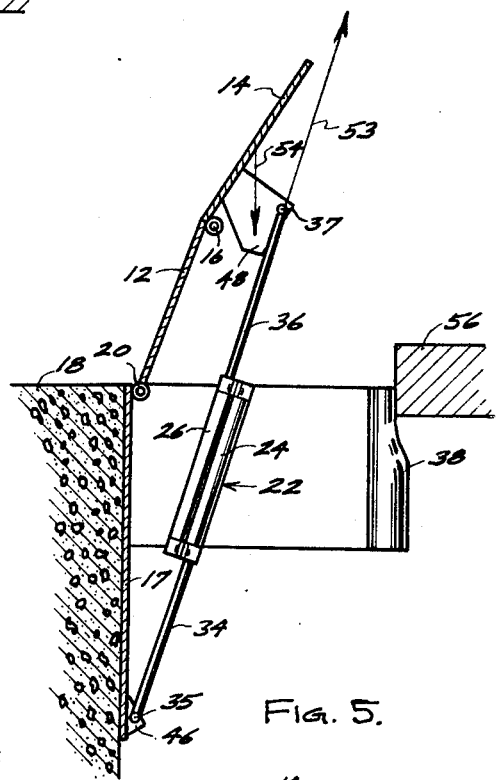
FIGURE 5 is a view similar to that of FIGURE 3 showing the dock leveler in its third position wherein the lip plate is higher than the junction between the plates.
Figure 6:
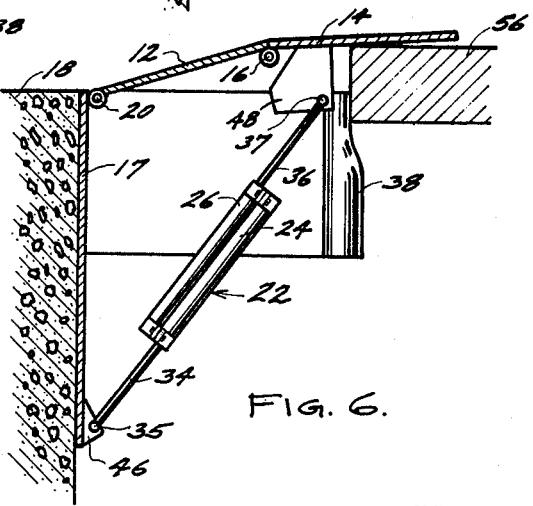
FIGURE 6 is a sectional view taken along the lines 6—6 of FIGURE 2, viewed in the direction of the arrows.

However, because of the relationships, as aforesaid, the valve 40 is deactuated when the position of FIGURE 5 is reached and the dock leveler drops down to the position of FIGURE 6 with lip plate 14 resting on truck bed 56 so that there is a smooth path from truck bed 56 to dock 18.

It should be understood the device will operate as described as long as the direction and resulting moments of force about hinge 16 are arranged in proper sequence throughout the succeeding positions of the dock leveler.

As various changes could be made in the above construction without departing from the scope of the invention, it is intended that all matter contained in the above description or shown in the accompanying drawings shall be interpreted as illustrative and not in a limiting sense. The words clockwise and counterclockwise are intended for explanatory purposes, it being understood that, if viewed from the opposite side from that used as a reference point in the illustrations, the moments of force would be opposite to those described.

The embodiments of the invention in which an exclusive property or privilege is claimed are defined as follows:

1. A dock leveler affixed to a dock for providing a smooth path between the dock and a vehicle bed comprising:
   a bridging plate having two opposite sides and two surfaces;
   first hinge means affixed to the dock and one of the opposite sides of the bridging plate such that the bridging plate extends outwardly from the dock and is movable with respect to the dock;
   a lip plate having at least one side and two surfaces;
   second hinge means affixed to the other of the opposite sides of the bridging plate and the side of the lip plate such that the lip plate is movable with respect to the bridging plate;
   stop means for precluding movement of the lip plate inwardly toward the bridging plate beyond a predetermined relative position wherein the plates are at an angle to each other;
   operating means and actuating means therefor; and
   means connecting the operating means between the dock and the lip plate and including a connection spaced from the second hinge means such that upon actuation of the operating means a force is applied to the dock leveler by the operating means at the connection to raise the plates of the dock leveler with respect to the dock and the vehicle bed from a first position in which the bridging plate surfaces are generally horizontal and the lip plate surfaces are generally vertical and the vector of the force of the operating means is directed inwardly of the second hinge means so that the moment of said force about the second hinge means urges the lip plate inwardly toward the bridging plate toward a second position in which the plates are at the predetermined relative position determined by the stop means and are raised relative to the first position such that the second hinge means is higher than either plate and the vector of the force of the operating means is directed outwardly of the second hinge means so that the moment of said force about the second hinge means urges the lip plate outwardly away from the bridging plate, and thence to a third position in which the lip plate is raised higher than the second hinge means, the plates abut each other at adjacent edges to form a continuous path and the sum of the moment of said force and the moment of force due to the mass of the lip plate about the second hinge retains the plates in such abutting relationship so that upon deactuating the actuating means the bridge plate and lip plate are lowered, while the plates abut each other, to bring the lip plate to rest on the vehicle bed and thereby provide a smooth path from the vehicle bed to the dock.

2. The invention of claim 1 wherein the operating means comprises a fluid operated cylinder with a movable rod therein with an end thereof protruding therefrom and the actuating means comprises a source of fluid under pressure and valve means which causes the fluid to be supplied to the cylinder in the actuated position and permits the fluid in the cylinder to be vented therefrom in the deactuated position.

3. The invention of claim 1 wherein the connecting means and the stop means include a bracket affixed to the lip plate and wherein the end of the movable rod is affixed to the bracket.

4. The invention of claim 1 wherein the operating means comprises a pair of fluid operated cylinders each of which has a movable rod therein with an end thereof protruding therefrom; the cylinders being placed alongside each other such that the protruding ends of the rods are opposite each other and the actuating means comprises a source of fluid under pressure and valve means which causes the fluid to be supplied to the cylinders in the actuated position and permits the fluid in the cylinders to be vented therefrom in the deactuated position.

5. The invention of claim 4 wherein the connecting means and the stop means include a bracket affixed to the lip plate and wherein the end of one of the movable rods is affixed to the bracket and the end of the other movable rod is affixed to the dock.

6. In a dock leveler affixed to a dock for providing a smooth path between the dock and a vehicle bed in which the dock leveler has a bridging plate hinged to the dock by a first hinge, a lip plate hinged to the bridging plate by a second hinge, means for raising the dock leveler, a bracket affixed to the lip plate, and means connecting the raising means to the bracket, said connecting means being located with respect to the second hinge and said bracket being shaped such that:

the force vector of the raising means is so directed that the moment of force about the second hinge due to the force vector of the raising means urges the lip plate toward the bridging plate when the dock leveler is in a first position in which the bridging plate is horizontal and the lip plate is vertical;

the force vector of the raising means is so directed that the moment of force about the second hinge due to the force vector of the raising means urges the lip plate away from the bridging plate when the dock leveler is in a second position in which the hinge between the plates is higher than either plate and the angle between the plates is acute; and the sum of the moments of forces about the second hinge due to the force vector of the raising means and the mass of the lip plate is in a direction which urges adjacent edges of the plates into abutment with one another when the dock leveler is in a third position in which the lip plate is higher than the hinge between the plates and the plates abut each other to form a continuous path.

7. The invention of claim 6 wherein the means for raising the dock leveler comprises:

a pair of fluid operated cylinders each of which has a movable rod with an end protruding therefrom;

the end of one rod being affixed to the dock and the end of the other rod being affixed to the bracket;

the cylinders being placed alongside each other such that the protruding ends of the rods are opposite each other so that when the rods move outwardly from the cylinders, the end of the rod affixed to the bracket is moved with respect to the end of the rod affixed to the dock an amount equal to the sum of the movements of the rods with respect to their associated cylinders.

8. A dock leveler for providing a smooth path between a dock and a vehicle bed comprising:

a bridging plate hinged to the dock;

a lip plate hinged to the bridging plate;

a pair of fluid operated cylinders each of which has a movable rod with an end protruding from the cylinder;

the cyyinders being placed alongside each other in reversed substantially parallel overlapping relationship so that the protruding ends of the rods are opposite each other;

means affixing the end of one rod to the dock and the end of the other rod to the dock leveler;

selective means for simultaneously supplying fluid under pressure to both of the cylinders and simultaneously venting fluid from both of the cylinders such that the rods are moved simultaneously in opposite directions and the end of the rod affixed to the dock leveler is moved with respect to the end of the rod affixed to the dock an amount equal to the sum of the movement of the rods with respect to their associated cylinders to selectively raise and lower the dock leveler.

9. The invention of claim 8 including a bracket affixed to the lip plate and wherein:

the affixing means includes a connection affixing the end of the rod affixed to the dock leveler to the bracket;

the affixing means includes a connection affixing the end of the rod affixed to the dock leveler to the bracket;

the connection being located with respect to the hinged connection between the lip plate and the bridging plate and the bracket being shaped such that:

the force vector of the movable rod affixed to the bracket is so directed as to urge the lip plate toward the bridging plate when the dock leveler is in a first position in which the bridge plate is horizontal and the lip plate is vertical;

the force vector of the movable rod affixed to the bracket is so directed as to urge the lip plate away from the bridging plate when the dock leveler is in a second position in which the junction of the bridging plate and the lip plate is higher than either plate and the angle between the plates is acute; and the force vector of the movable rod affixed to the bracket is directed beyond the junction of the bridging plate and the lip plate and beyond the center of gravity of the lip plate in the direction of the lip plate when the dock leveler is in a third position in which adjacent edges of the plates abut one another to form a continuous path.

References Cited

UNITED STATES PATENTS

| 3,271,801 | 9/1966 | Dieter | 14—71 |
| 3,323,158 | 6/1967 | Loomis | 14—71 |

JACOB L. NACKENOFF, Primary Examiner